United States Patent [19]

Christensen et al.

[11] Patent Number: 4,532,310

[45] Date of Patent: Jul. 30, 1985

[54] CONTACTING ARYLENE SULFIDE POLYMER WITH OXYGEN IN EXTRUDER BY CONTINUOUS PROCESSING

[76] Inventors: Don C. Christensen; Raymond G. Voss, both of Suite 1107, 1825 K St., NW., Washington, D.C. 20006

[21] Appl. No.: 614,610

[22] Filed: May 29, 1984

[51] Int. Cl.³ .............................................. C08G 75/16
[52] U.S. Cl. ..................................... 525/537; 528/388
[58] Field of Search ......................... 525/537; 528/388

[56] References Cited

U.S. PATENT DOCUMENTS 3,524,835  8/1970  Edmonds, Jr. et al. ........... 260/79.1
3,699,087  10/1972 Wood et al. ........................... 260/79
3,717,620  2/1973  Rohlfing ............................... 260/79

*Primary Examiner*—Harold D. Anderson

[57] ABSTRACT

A method for continuously treating arylene sulfide polymer by passing the polymer through an extruder operated at conditions to produce mixing action at a temperature above the melting point of the polymer while contacting an amount of oxygen sufficient to produce a reduction of melt flow within a fixed residence time in the extruder.

8 Claims, No Drawings

CONTACTING ARYLENE SULFIDE POLYMER WITH OXYGEN IN EXTRUDER BY CONTINUOUS PROCESSING

BACKGROUND OF THE INVENTION

This invention relates to aromatic sulfide polymers, more particularly poly(arylene sulfide) resins, and more particularly poly(p-phenylene sulfide) resins. More particularly, it relates to the treatment of these polymers to decrease the melt flow in an aspect of the invention that relates to the curing of arylene sulfide polymers by contact with oxygen. In still another aspect of the invention, it relates to the production of polymer which is characterized by a low-melt flow.

U.S. Pat. No. 3,524,835 discloses that the contact of poly(arylene sulfide) resin heated to an elevated temperature above the melting point of the resin in an oxidizing atmosphere produces an increase in the molecular weight, i.e., a decrease of the melt flow, of the polymer thus treated. The present invention provides a method that sets this knowledge to practical use by providing means that facilitate the contact of the polymer with oxygen under treating conditions. Such a process makes possible the degree of ease of operation that can lead to commercialization.

It is, therefore, an object of this invention to provide means for the facilitation of curing the resin, i.e., lowering the melt flow of poly(arylene sulfide) resin. It is another object of this invention to provide a method by which cured poly(arylene sulfide) resin can be produced that has decreased melt flow. It is still another object of this invention to provide a method for overcoming the practical difficulties of treating a material of increasing viscosity. It is still another object of this invention to provide a continuous process for decreasing the melt flow of arylene sulfide polymer.

Other aspects, objects, and the various advantages of this invention will become apparent upon reading the specification and the appended claims.

STATEMENT OF THE INVENTION

According to this invention, a method is provided for the continuous treating of arylene sulfide polymers in which the polymer is contacted with oxygen while passing the polymer through an extruder operating at conditions to produce a mixing action at temperature above the melting point of the polymer with the oxygen being supplied in an amount to attain a reduction of melt flow for a fixed residence time within the extruder.

The method for treating arylene sulfide polymer according to this invention is applicable to polymers produced by any of the known methods for producing poly(arylene sulfide) such as those set out in U.S. Pat. No. 3,354,129 in which polyhalo aromatic compounds, alkali metal sulfides, and organic amides are contacted at polymerization conditions, or alternatively, by such methods as set out in U.S. Pat. No. 3,919,177 in which p-dihalobenzene, an alkali metal sulfide, an organic amide, and an alkali metal carboxylate are contacted at polymerization conditions, often together with an alkali metal hydroxide, such as sodium hydroxide, and/or a polyhalo aromatic compound, such as 1,2,4-trichlorobenzene. If desired, a lithium halide such as lithium chloride, can be used in place of the alkali metal carboxylate in the production of the polymer. If desired, water, which can be present with the reactant, can be removed by distillation prior to the polymerization reaction.

The poly(arylene sulfide) usually, more specifically poly(p-phenylene sulfide)—which is treated by the process of this invention, will normally be particulate polymer that has been recovered from the reaction mixture and washed or subjected to treatment for removal of ash-forming contaminants. The invention is useful in treating polymers of any particle size ranging from the fine powder obtained by flashing the polar diluent from the reaction mixture to particles of greater size recovered from the reaction slurry by other methods. The particulate polymer is reduced to a hot melt within the extruder for the treatment process.

The source of oxygen for the treatment can be molecular oxygen, air, or a chemical compound such as a peroxide that will thermally decompose.

The apparatus necessary for carrying out the invention is any extruder that can be operated at temperature and pressure levels to reduce the resin particles to a hot melt, that supplies mixing action over a residence time sufficient to assure sufficient contact between the melted resin and oxygen, and that has been adapted for the input of an oxygen-containing gas or an oxygen-containing chemical compound to provide contact of oxygen with the hot melt along the length of the screw. Generally, a twin screw extruder is preferred because of the superior masticating action and the use of an extruder having means for supplying both heat and cooling to the barrel of the extruder is also preferred in the event that the contact between the polymer and the oxygen becomes exothermic. The process of the invention should be easily carried out using commercially-available extrusion equipment that has been subjected to minor modification to provide inlet of the oxygen-containing contact material.

In the process of the invention, particulate polymer is loaded into the extruder, melted, and the temperature of the melt is brought into the range of about 550° to about 850° F. (228°–454° C.) Gas containing oxygen is then admitted to the extruder using pressure that is sufficient to force the gas into the melt. The oxygen-containing gas which will usually be air or pure oxygen but which could be a mixture of molecular oxygen and inert gas is admitted at a rate to provide a weight ratio of about 5 oxygen/1 polymer to about 0.01 oxygen/1 polymer preferably, in a range of about 1 oxygen/1 polymer to about 0.1 oxygen/1 polymer.

In the event that an oxygen-containing chemical compound is used as the oxygen source, it can be added to the polymer before the polymer is admitted to the extruder or during extrusion as in the case of the oxygen-containing gas. The amount of this material used would depend on the molecular weight of the compound and on the decomposition half-life at the temperature employed in the extruder and would be in an amount to make an equivalent amount of oxygen available to the ratios of oxygen to polymer as stated above.

Extruders or similar machines suitable for curing arylene sulfide polymers can be of the single screw or multiple screw type, e.g., twin-screw which can be co-rotating or counter rotating. The amount of cure obtained in this process is directly proportional to the initial melt flow of the starting polymer, the melt temperature used, the residence time employed and the amount of oxygen contacting the molten polymer as it passes through the extruder. Devolatilizing extruders, particularly twin screw machines, are preferred since one or more openings along the barrel are already available, if needed, for introduction of air, oxygen, solutions, etc., and more precise control of the quantity of polymer traversing through the extruder is possible.

Manipulation of the above parameters is well within the skill of experienced operators to obtain a product having the desired melt flow. Generally, it is preferred that the highest polymer melt temperatures employed occur during about the first half of the total residence time used in the extrusion process in order to achieve the greatest amount of curing. For example, a temperature of about 850° F. can be employed in this section of a twin screw extruder operating at a screw speed of about 300 RPM with a feed rate of about 26 lbs/hr employing as the feed, PPS having a melt flow of about 2500 g/minute. Thereafter the melt temperature is decreased to about 600° F. The lower temperatures facilitate handling of the polymer melt exiting the die.

An advantage of curing arylene sulfide polymers in an extrusion process is that the extrudate can be easily converted into pellets, discs, spheres, etc., by passing it through a suitable die and treating the product emerging from the die as needed to achieve the desired shape. For example, the polymer melt can be passed through a strand die and the resulting strands can be chopped into pellets before or after they are cooled by using revolving knives. The recovered pellets can be subsequently employed in conventional processing machines, e.g., extruders, injection molding devices, and the like to produce such articles as film, sheets, fibers, containers, molded goods, etc.

The practical advantage of the extrusion method of contacting oxygen with the hot polymer melt is the ease with which the equipment can handle the increased viscosity of the polymer as the melt flow is decreased in the treating process. Other equipment that has not been designed for the handling of highly viscous material will reach a point beyond which the polymer becomes too viscous for operation.

The treatment can be carried out, if desired, with the presence of fillers added to the uncured arylene sulfide polymer. Glass fibers, glass beads, clay, talc, carbon black, titanium dioxide, or any of the other common solid fillers used with arylene sulfide polymer can be present in the extrusion mixture.

The following example illustrates the process of this invention. The example should be taken as illustrative and not restrictive.

EXAMPLE I

Particulate poly(p-phenylene sulfide), abbreviated PPS for convenience, was fed to an electrically heated twin screw compounding extruder, said screws having a diameter of 53 mm (about 2 inches). The extruder employed was a model ZSK-53 available from Werner and Pfleidener Corp., Waldwick, NJ. The screws operate in a co-rotating, intermeshing configuration. The nominal melt flow of the PPS was about 2,500 g/10 minutes as determined in accordance with ASTM D1238-70 (316° C. and 5 kg load). Air was injected into the PPS melt being advanced through the connected four barrels in three of the ports or vents available for such a purpose. In one instance, run 1, a partial vacuum of 28″ mercury (1 psia) was applied to the fourth vent (one nearest the die) and in the second instance, run 2, that vent was open to the atmosphere. In this extruder, a vent is located on the top side of each barrel and an injection port is located on the bottom side of each barrel adjacent an opening provided for a thermocouple to measure the melt temperature of the polymer passing that location. The openings can be open or closed.

Air was injected in one or more vents and ports during a run. The volume of air contacting the polymer melt at that location is measured in terms of standard cubic feet per minute (SCFM). The volume of oxygen contained in a unit volume of air is assumed to be 21 volume percent.

For convenience, the following terminology is employed: each barrel, 1, 2, 3 and 4 contains a corresponding vent, V, corresponding port, P, and corresponding thermocouple, T. For instance, B-2P, indicates that the port in barrel 2 is being employed for the indicated purpose.

The operating conditions used and results obtained are presented in the Table.

TABLE I

| CURING PPS IN EXTRUDER WITH ADDED AIR | | |
|---|---|---|
| Run No | 1 | 2 |
| Screw speed, RPM | 301 | 239 |
| Polymer rate, lbs/hr | 26.5 | 41.0 |
| Residence time, seconds | 30 | 36 |
| Polymer melt temp ° F. | | |
| B-1T | 696 | 657 |
| B-2T | 842 | 761 |
| B-3T | 592 | 610 |
| B-4T | 594 | 545 |
| Die temp °F. | 637 | 597 |
| Added air, SCFM | | |
| B-1P | 2.1 | 4.9 |
| B-2V | 4.7 | 5.7 |
| B-2P | 4.7 | 5.7 |
| Total added air, SCFM | 11.5 | 16.3 |
| Total SCF air/hour | 690 | 978 |
| Calc SCF oxygen/hour | 145 | 205 |
| Calc wt oxygen/hour, lbs | 12.9 | 18.3 |
| Calc wt ratio, oxygen: PPS | 0.50:1 | 0.45:1 |
| Product melt flow, g/10 min | 205 | 332 |

The melt flow of the starting PPS has been reduced from about 2500 g/10 minutes to 205 or 332 g/10 minutes as the values given in runs 1 and 2 in the Table shown above.

These results demonstrate that PPS can be at least partially cured in an extruder by contacting the polymer melt at an elevated temperature for a relatively limited time, e.g., 30–36 seconds, with a source of oxygen as the melt traverses the extruder barrels. Melt temperature, residence time, and oxygen concentration are interrelated as expected. In run 1, the shorter residence time and least amount of oxygen is coupled with the higher temperature employed. The product melt flow of 205 the lower of the two runs, suggests that the most important variable under the conditions used may be the temperature. In run 2, a longer residence time, greater concentration of oxygen and a lower maximum temperature combine to give a resin having the higher melt flow, 332.

Although only air was used as the source of oxygen in the Example it is apparent that pure oxygen alone or oxygen admixed with a minor amount of one or more gases inert in the process such as argon, nitrogen, etc., could be employed as well. Also, oxygen derived from a chemical source such as by decomposition of a peroxide, e.g., hydrogen peroxide, dicumyl peroxide, 2,5-dimethyl-2,5-bis(t-butylperoxy) hexyne 3, could also be used. The peroxide can be premixed with the polymer feed or added through one or more openings in the extruder barrels, generally in the form of a solution for convenience and safety.

We claim:

1. A method for continuous treatment of arylene sulfide polymer comprising contacting said polymer with oxygen while passing said polymer through an extruder operating at conditions to produce a mixing action at temperature above the melting point of the polymer, said oxygen supplied in an amount to attain a reduction of melt flow for a fixed residence time within the extruder.

2. A method of claim 1 wherein the oxygen supply is chosen from air or molecular oxygen.

3. A method of claim 1 wherein the oxygen is derived from decomposition of an organic chemical compound.

4. A method of claim 3 wherein said organic chemical compound is a peroxide.

5. A method of claim 1 wherein the melted polymer within the extruder barrel is subjected to heating or cooling as necessary to maintain the temperature within a range of about 550 to about 850° F.

6. A method of claim 2 wherein the melted polymer within the extruder barrel is subjected to heating or cooling as necessary to maintain the temperature within a range of about 550 to about 850° F.

7. A method of claim 3 wherein the melted polymer within the extruder barrel is subjected to heating or cooling as necessary to maintain the temperature within a range of about 550 to about 850° F.

8. A method of claim 4 wherein the melted polymer within the extruder barrel is subjected to heating or cooling as necessary to maintain the temperature within a range of about 550 to about 850° F.

* * * * *